United States Patent
Nonami

(10) Patent No.: US 11,292,323 B2
(45) Date of Patent: Apr. 5, 2022

(54) VEHICULAR SUNROOF UNIT

(71) Applicant: AISIN SEIKI KABUSHIKI KAISHA, Kariya (JP)

(72) Inventor: Shuhei Nonami, Kariya (JP)

(73) Assignee: Aisin Corporation, Kariya (JP)

( * ) Notice: Subject to any disclaimer, the term of this patent is extended or adjusted under 35 U.S.C. 154(b) by 0 days.

(21) Appl. No.: 17/153,452

(22) Filed: Jan. 20, 2021

(65) Prior Publication Data
US 2021/0252953 A1 Aug. 19, 2021

(30) Foreign Application Priority Data
Feb. 13, 2020 (JP) .............................. JP2020-022359

(51) Int. Cl.
*B60J 7/12* (2006.01)
*B60J 7/20* (2006.01)
*B60J 7/22* (2006.01)

(52) U.S. Cl.
CPC . *B60J 7/12* (2013.01); *B60J 7/20* (2013.01); *B60J 7/22* (2013.01)

(58) Field of Classification Search
CPC ......... B60J 7/12; B60J 7/20; B60J 7/22; B60J 7/00; B60J 7/02; B60J 7/043; B60J 7/053
USPC ............ 296/180.1, 216.01, 217, 216.04, 222
See application file for complete search history.

(56) References Cited

U.S. PATENT DOCUMENTS

| 8,789,879 | B2 | 7/2014 | Sawada et al. |
| 9,186,971 | B1 | 11/2015 | Lee |
| 9,227,489 | B2 * | 1/2016 | Farber .................... B60J 7/0046 |
| 9,248,728 | B2 | 2/2016 | Hiramatsu et al. |
| 11,052,738 | B2 * | 7/2021 | Nakamura ................. B60J 7/22 |

FOREIGN PATENT DOCUMENTS

| JP | 2013-193601 A | 9/2013 |
| JP | 2015-91681 A | 5/2015 |
| JP | 2016-60480 A | 4/2016 |

\* cited by examiner

*Primary Examiner* — Dennis H Pedder
*Assistant Examiner* — Joyce Eileen Hill
(74) *Attorney, Agent, or Firm* — Finnegan, Henderson, Farabow, Garrett & Dunner, LLP

(57) ABSTRACT

In a sunroof unit, a movable panel includes a front sliding portion and a rear sliding portion that position an arm by sliding with the arm. When the movable panel moves in a second sliding range being a movement range of the movable panel when the rear sliding portion slides with the arm, a gap is generated between the front sliding portion and the arm.

2 Claims, 8 Drawing Sheets

_(12) United States Patent_

VEHICULAR SUNROOF UNIT

CROSS REFERENCE TO RELATED APPLICATIONS

This application is based on and claims priority under 35 U.S.C. § 119 to Japanese Patent Application 2020-022359, filed on Feb. 13, 2020, the entire content of which is incorporated herein by reference.

TECHNICAL FIELD

This disclosure generally relates to a vehicular sunroof unit.

BACKGROUND DISCUSSION

JP2016-60480A (Reference 1) describes a sunroof unit including a movable panel that moves between a full open position of fully opening a roof opening of a vehicle and a full closed position of fully closing the roof opening of the vehicle, and a deflector that adjusts a flow of traveling wind in the roof opening. The deflector includes a pair of arms disposed on each of both end portions in a width direction of the roof opening, a base that supports the pair of arms, a pair of springs that each bias an associated one of the pair of arms, and a clothing member to be developed in a front space of the roof opening according to a posture of the pair of arms. A base end of the arm can rotate about a shaft line extending in the width direction with respect to the base, and a tip of the arm is coupled to the clothing member.

When the movable panel moves forward toward the full closed position, the pair of arms are inclined by sliding with the movable panel. At this time, the clothing member is stored below the movable panel. On the other hand, when the movable panel moves rearward from the full closed position, the pair of arms rise based on a biasing force of the pair of springs. At this time, the clothing member is developed toward the front of the roof opening, and traveling wind entering a vehicle room via the roof opening is suppressed.

In the sunroof unit as described above, when the movable panel is disposed in the full closed position, the clothing member may be sandwiched between the movable panel and the arm. When the movable panel moves rearward from the full closed position while the clothing member is sandwiched between the movable panel and the arm, there is a risk that a strange sound may be generated when the clothing member is relatively pulled from between the movable panel and the arm.

A need thus exists for a vehicular sunroof unit which is not susceptible to the drawback mentioned above.

SUMMARY

A vehicular sunroof unit that solves the problem described above includes a movable panel that moves in a vehicle front-rear direction between a full closed position of closing a roof opening of a vehicle body and a full open position of opening the roof opening, a screen that is developed in a space of the roof opening toward a front of the vehicle when the movable panel moves from the full closed position to a rear of the vehicle, and is folded and stored when the movable panel moves from the full open position to the front of the vehicle, and an arm that rotates about a shaft line extending in a width direction of the vehicle between a developing position of developing the screen and a storing position of storing the screen while supporting the screen at a tip, and is biased toward the developing position. The movable panel includes a sliding portion that positions the arm by sliding with the arm. The sliding portion includes a front sliding portion, and a rear sliding portion located closer to the rear of the vehicle than the front sliding portion. A movement range of the movable panel includes a first sliding range in which the front sliding portion slides with the arm, and a second sliding range that is a movement range closer to the front of the vehicle than the first sliding range and in which the rear sliding portion slides with the arm. A gap is generated between the front sliding portion and the arm when the movable panel moves in the second sliding range.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
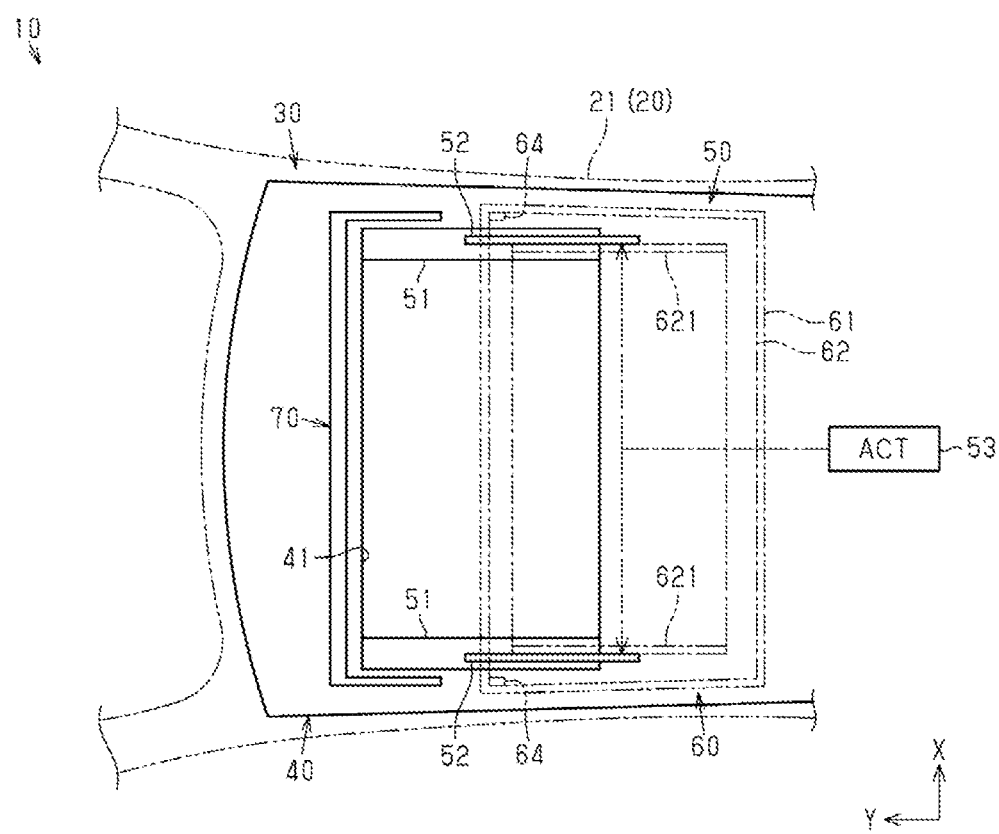
FIG. 1 is a plan view of a vehicle including a vehicular sunroof unit according to one embodiment.

One embodiment of a vehicular sunroof unit (hereinafter also referred to as a "sunroof unit") will be described with reference to the drawings. In the present embodiment, a direction of a sunroof unit is defined based on a state where the sunroof unit is mounted on a vehicle. Further, a width direction of the vehicle is simply referred to as a "width direction", a front-rear direction of the vehicle is simply referred to as a "front-rear direction", and an up-down direction of the vehicle is simply referred to as an "up-down direction". In the drawings, axes extending in the width direction, the front-rear direction, and the up-down direction are indicated by an X axis, a Y axis, and a Z axis, respectively.

As illustrated in FIG. 1, a vehicle 10 includes a vehicle body 20 including a roof 21, and a sunroof unit 30 mounted on the roof 21. The sunroof unit 30 includes a base panel 40, a sunroof device 50, and a deflector device 70.

The base panel 40 includes a roof opening 41 having a rectangular shape in a plan view in the up-down direction. The roof opening 41 has the front-rear direction as a short-side direction and the width direction as a long-side direction. When the base panel 40 is viewed from the width direction and the front-rear direction, it is preferable that the base panel 40 has a shape conforming to a shape of the roof 21. The base panel 40 may be formed by performing press working on a metal plate material, and may be formed by bonding a plurality of frames and panels to each other.

Next, the sunroof device 50 will be described. As illustrated in FIG. 1, the sunroof device 50 includes a movable panel 60 that opens and closes the roof opening 41, a pair of guide rails 51 extending in the front-rear direction, a pair of functional components 52 that move along the pair of guide rails 51, and an actuator 53 that drives the pair of functional components 52.

Figure 2:
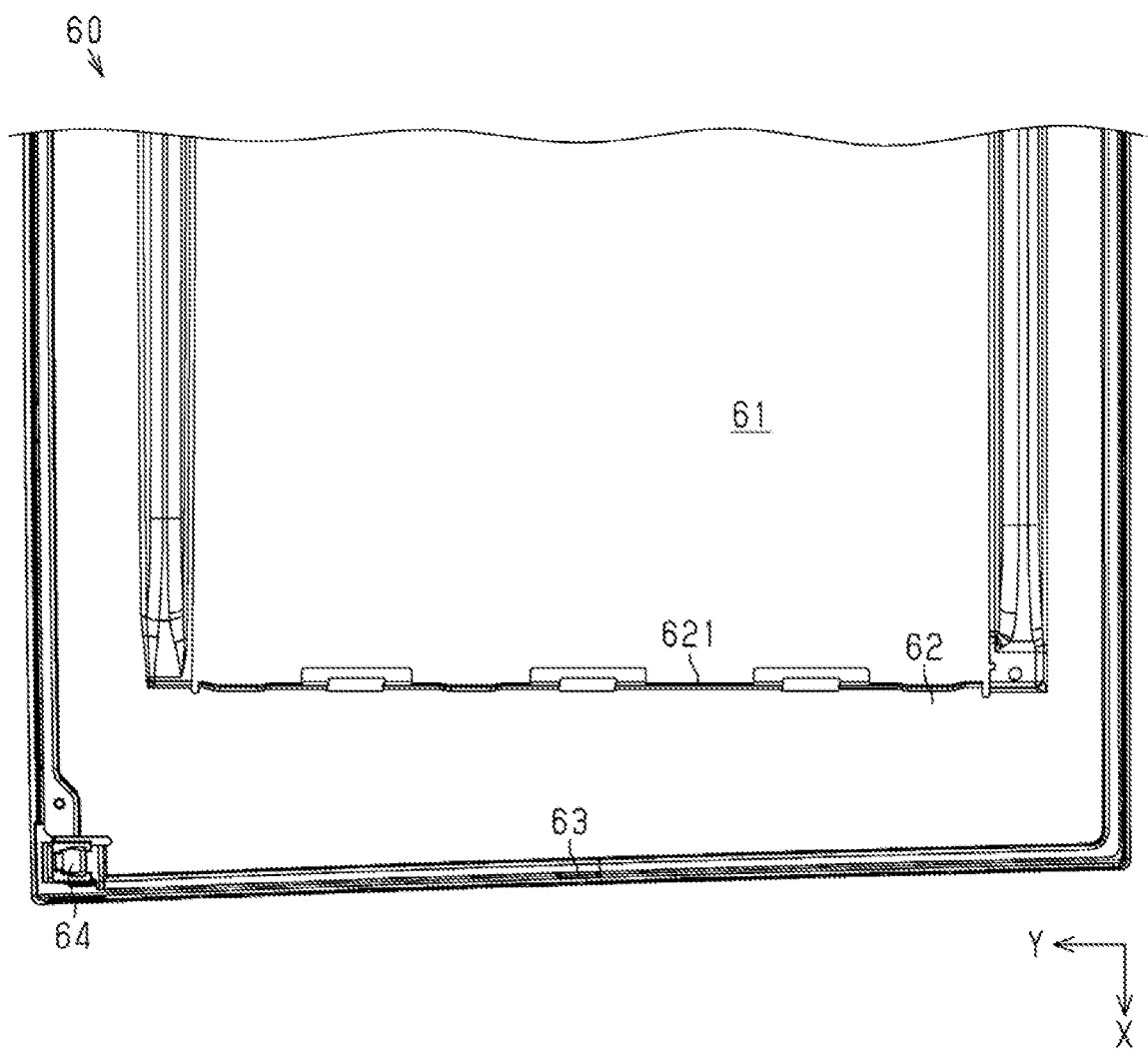
FIG. 2 is a bottom view of a movable panel of the sunroof unit.

As illustrated in FIG. 1, the movable panel 60 has a substantially rectangular shape larger than the roof opening 41 in the plan view in the up-down direction. As illustrated in FIGS. 1 and 2, the movable panel 60 includes a panel main body 61 having translucency, a support panel 62 that supports the panel main body 61 from a back side, a resin layer 63 being a layer between the panel main body 61 and the support panel 62, and a pair of sliding portions 64 that slide with a pair of arms 74 of the deflector device 70 described later.

The panel main body 61 may have translucency, and is made of, for example, glass or resin. The support panel 62 has a rectangular shape in the plan view in the up-down direction. The support panel 62 is formed by, for example, performing press working on a metal plate material. The support panel 62 includes a pair of fixing brackets 621 extending in the front-rear direction with an interval therebetween in the width direction. The pair of fixing brackets 621 are a section to which the functional components 52 of the sunroof device 50 are assembled. The resin layer 63 is formed by, for example, reaction injecting molding (RIM). As illustrated in FIG. 2, it is preferable that the resin layer 63 extends to an edge of the panel main body 61, and constitutes a protective layer that protects the edge of the panel main body 61.

Figure 3:
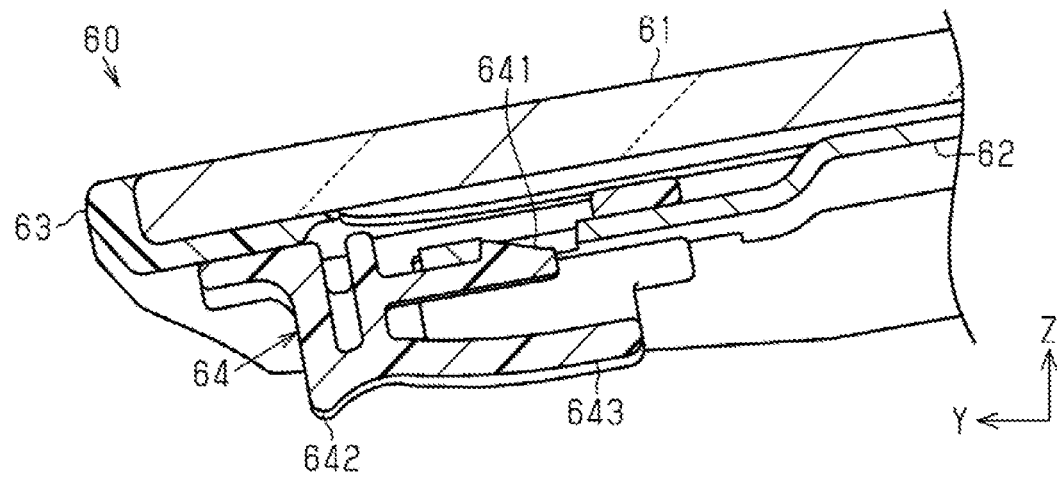
FIG. 3 is a cross-sectional view orthogonal to a width direction of the movable panel.

As illustrated in FIGS. 1 and 2, the pair of sliding portions 64 are each fixed to a position closer to a front end and a both side end of the support panel 62. As illustrated in FIG. 3, the sliding portion 64 includes an engagement portion 641 engaged with the support panel 62, a front sliding portion 642 protruding downward, and a rear sliding portion 643 extending rearward while being slightly curved downward. The front sliding portion 642 is located at a front end of the sliding portion 64, and the rear sliding portion 643 is located closer to the rear than the front sliding portion 642. In the sliding portion 64, a portion between the front sliding portion 642 and the rear sliding portion 643 is recessed upward. When the movable panel 60 takes a posture illustrated in FIG. 3, i.e., when the movable panel 60 is disposed in a full closed position of closing the roof opening 41, a tip of the front sliding portion 642 is located closer to a lower side of the rear sliding portion 643.

The pair of guide rails 51 are assembled to both sides of the base panel 40 with an interval therebetween in the width direction. The pair of guide rails 51 extend along an inner edge in the width direction of the roof opening 41. The pair of functional components 52 move in the front-rear direction along the pair of guide rails 51, and thus change a posture of the movable panel 60 and move the movable panel 60 in the front-rear direction.

The sunroof device 50 moves the movable panel 60 between the full closed position of closing the roof opening 41 and a full open position of opening the roof opening 41 by driving the actuator 53. In the following description, moving the movable panel 60 in a direction from the full closed position toward the full open position is referred to as an "open operation", and moving the movable panel 60 in a direction from the full open position toward the full closed position is referred to as a "close operation". A movement direction when the movable panel 60 performs the open operation is rearward, and a movement direction when the movable panel 60 performs the close operation is forward. Note that, when the pair of guide rails 51 are curved in a side view in the width direction, a movement direction during the open/close operations of the movable panel 60 is a direction according to a curve of the guide rails 51.

Figure 4:
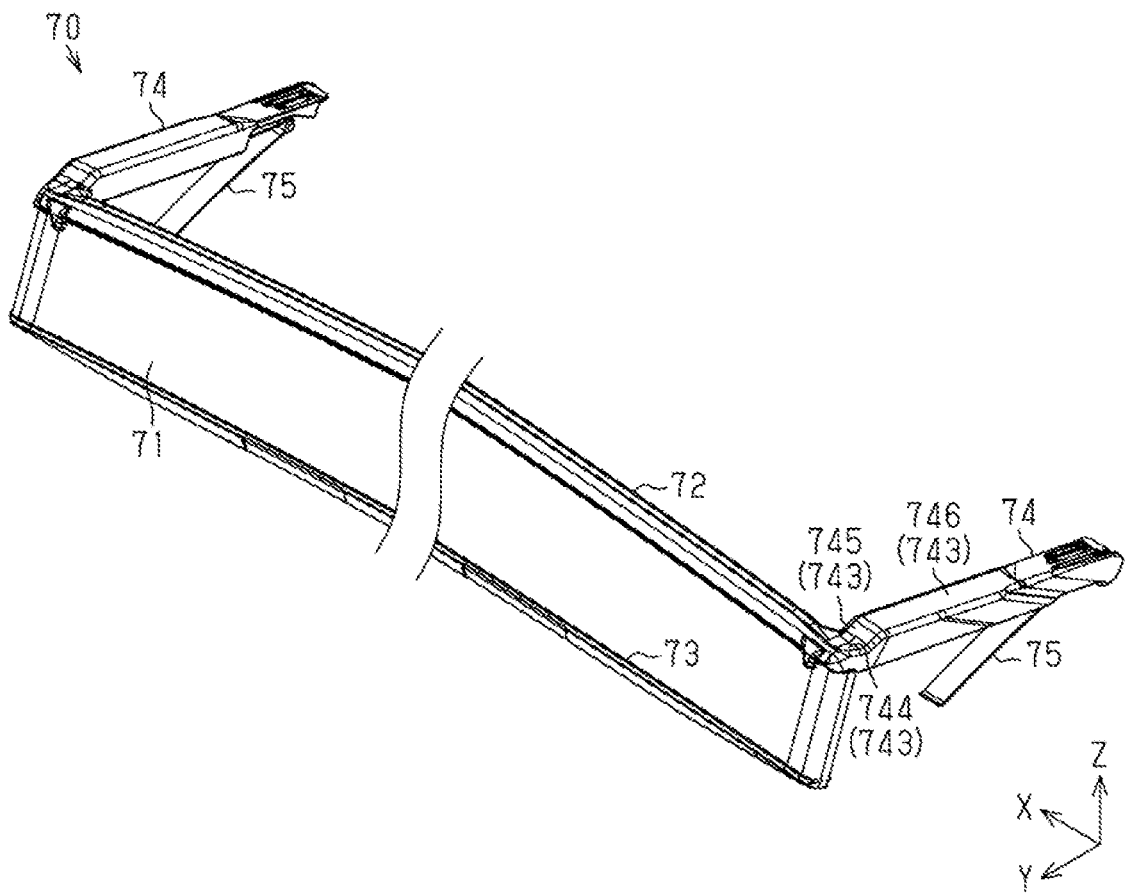
FIG. 4 is a perspective view of a deflector device of the sunroof unit.
Figure 5:
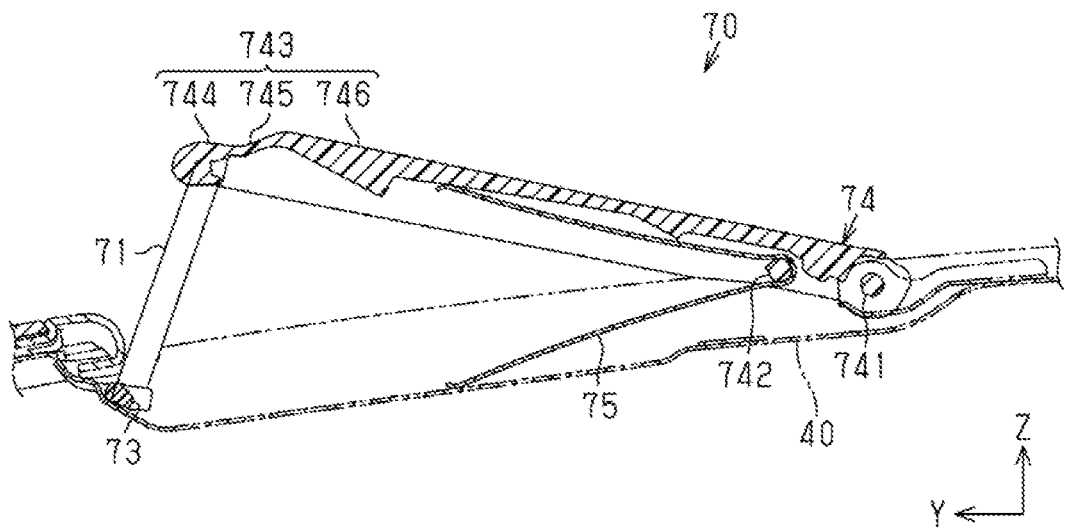
FIG. 5 is a cross-sectional view orthogonal to a width direction of the deflector device.

Next, the deflector device 70 will be described. As illustrated in FIGS. 4 and 5, the deflector device 70 includes a screen 71 having a band shape with the width direction as a long-side direction, a movable frame 72 that supports an upper end of the screen 71, a fixing frame 73 that supports a lower end of the screen 71, the pair of arms 74 that support, at tips, the movable frame 72, and a pair of biasing members 75 that bias the pair of arms 74.

The screen 71 is a foldable mesh member made of resin or cloth. The screen 71 is developed in a front space of the roof opening 41 and stored in a folded state. Thus, it is preferable that the screen 71 is made of a material that is less likely to be creased.

The movable frame 72 and the fixing frame 73 are a stick-shaped member with the width direction as a long-side direction. The movable frame 72 is curved in such a way that a central portion in the width direction is located closer to an upper side than both end portions in the width direction. Both ends of the movable frame 72 are coupled to the tips of the pair of arms 74. In the present embodiment, the movable frame 72 and the pair of arms 74 are integrally formed together, but can also be separately formed. The fixing frame 73 is fixed to a position of the base panel 40 closer to the front than the roof opening 41. In other words, when the movable frame 72 is displaced in a direction away from the fixing frame 73, the screen 71 is developed. On the other hand, when the movable frame 72 is displaced in a direction closer to the fixing frame 73, the screen 71 is folded and stored.

The arm 74 extends in a direction substantially orthogonal to the movable frame 72. The arm 74 also has a point integral with the movable frame 72, and supports an end portion in the width direction of the screen 71. In other words, the arm 74 supports, at the tip, the upper end and the end portion in the width direction of the screen 71.

As illustrated in FIG. 5, the arm 74 includes a rotation shaft 741 rotatably supported by the base panel 40, a support shaft 742 that supports the biasing member 75, and a regulation surface 743 that slides with the sliding portion 64 of the movable panel 60. The rotation shaft 741 and the support shaft 742 are located on a base end portion of the arm 74 with the width direction as a shaft direction. The rotation shaft 741 is located closer to the base end of the arm 74 than the support shaft 742. Then, the arm 74 rotates about a shaft line extending in the width direction, i.e., a shaft line of the rotation shaft 741 between a developing position of developing the screen 71 and a storing position of storing the screen 71. The arm 74 slides with the sliding portion 64 of the movable panel 60, and is thus positioned within a rotation range between the developing position and the storing position.

The regulation surface 743 is a surface facing the movable panel 60 in the up-down direction in the arm 74 when the movable panel 60 is located near the full closed position. The regulation surface 743 includes a first regulation surface 744 extending in the substantially same direction as the long-side direction of the arm 74, a second regulation surface 745 extending in a direction intersecting the first regulation surface 744, and a third regulation surface 746 extending in the substantially same direction as the first regulation surface 744. The first regulation surface 744 is located closest to a front end of the arm 74, the second regulation surface 745 extends rearward from a rear end of the first regulation surface 744, and the third regulation surface 746 extends rearward from a rear end of the second regulation surface 745. The first regulation surface 744 is provided in a position lower than the third regulation surface 746 by one step.

The biasing member 75 is a plate spring having a substantially V shape in a side view in the width direction. The biasing member 75 is disposed between the base panel 40 and the arm 74. The biasing member 75 biases the arm 74 in a direction away from the base panel 40. Specifically, in other words, the biasing member 75 biases the arm 74 from the storing position toward the developing position. Note that the biasing member 75 may be another spring and may be block-shaped rubber as long as the biasing member 75 can generate an elastic force in accordance with an amount of compression. Further, when the arm 74 itself can be greatly elastically deformed, the deflector device 70 may not include the biasing member 75.

Figure 6:
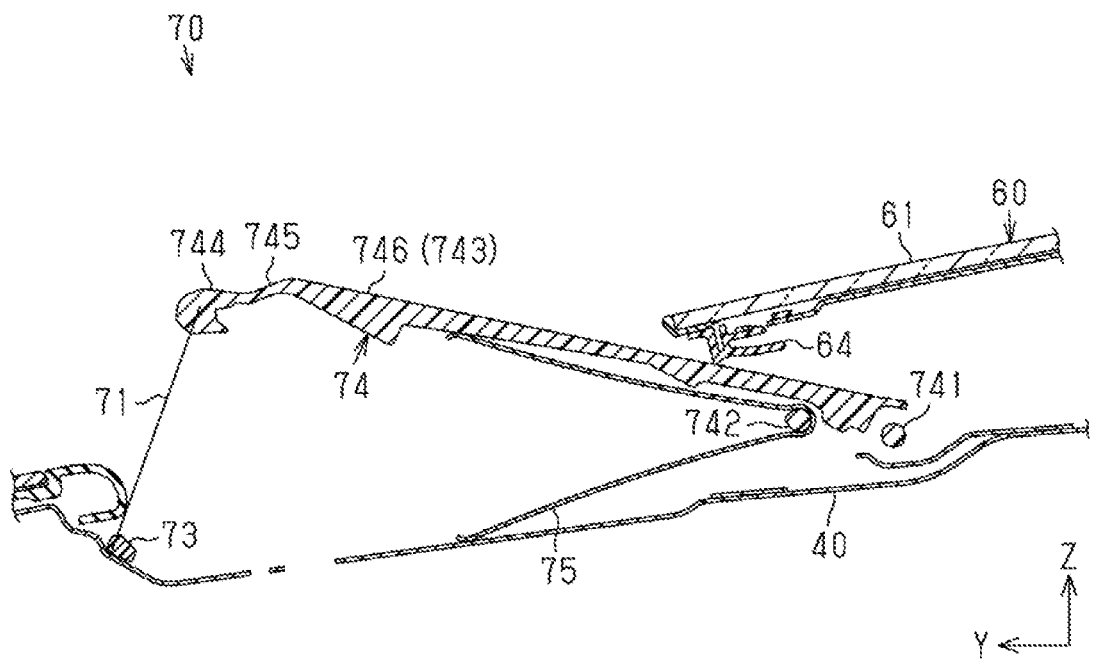
FIG. 6 is an end view orthogonal to a width direction of the sunroof unit.

As illustrated in FIG. 6, when the movable panel 60 opens a part of the roof opening 41, the arm 74 of the deflector device 70 is disposed in the developing position of developing the screen 71 by a biasing force of the biasing member 75. In the developing position, the screen 71 is brought into a vertically stretched state by being pulled upward by the movable frame 72. In this way, the deflector device 70 can regulate a flow of traveling wind near the roof opening 41 during traveling of the vehicle 10.

Figure 7:
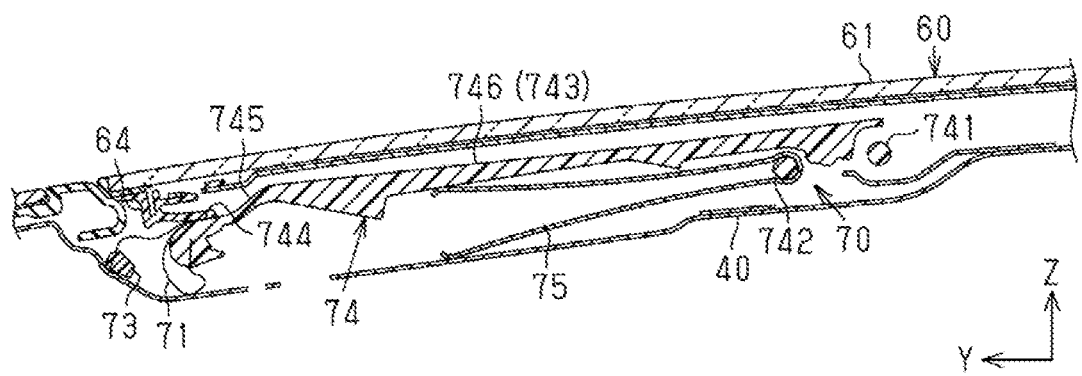
FIG. 7 is an end view orthogonal to the width direction of the sunroof unit.

As illustrated in FIG. 6, when the movable panel 60 performs the close operation from a state where the sliding portion 64 of the movable panel 60 is in contact with the arm 74 of the deflector device 70 toward the full closed position, the sliding portion 64 of the movable panel 60 slides with the arm 74. Then, as the movable panel 60 approaches the full closed position, a portion of the arm 74 sliding with the sliding portion 64 of the movable panel 60 changes in order of the third regulation surface 746, the second regulation surface 745, and the first regulation surface 744. As a result, the arm 74 rotates in a direction in which a forward angle is greater while elastically deforming the biasing member 75. As illustrated in FIG. 7, when the movable panel 60 performs the close operation to the vicinity of the full closed position, the arm 74 is disposed in the storing position of storing the screen 71. In this way, the screen 71 is stored in a state of being folded between the base panel 40 and the movable panel 60.

On the other hand, when the movable panel 60 performs the open operation from the full closed position, in contrast to the case where the movable panel 60 performs the close operation, the portion of the arm 74 sliding with the sliding portion 64 of the movable panel 60 changes in order of the first regulation surface 744, the second regulation surface 745, and the third regulation surface 746. Thus, when the movable panel 60 performs the open operation, the arm 74 gradually rotates from the storing position to the developing position, based on a biasing force of the biasing member 75. In other words, the arm 74 rotates in a direction in which the forward angle is smaller. When the movable panel 60 performs the open operation to the position illustrated in FIG. 6, the arm 74 is disposed in the developing position. In this way, the screen 71 is developed in conjunction with the open operation of the movable panel 60.

Next, action of a comparative example and the present embodiment will be described. First, action of a sunroof unit 30X according to the comparative example will be described with reference to FIGS. 8 to 10. When the sunroof unit 30X according to the comparative example is compared with the sunroof unit 30 according to the present embodiment, a shape of the sliding portion 64 of the movable panel 60 is different.

Specifically, a sliding portion 64X of a movable panel 60X according to the comparative example includes a front sliding portion 642X including a tip protruding downward, and a rear sliding portion 643X extending rearward. The front sliding portion 642X according to the comparative example has an amount of downward protrusion greater than that of the front sliding portion 642 according to the present embodiment. Further, the sliding portion 64X according to the comparative example has an amount of upward recession between the front sliding portion 642X and the rear sliding portion 643X smaller than that of the sliding portion 64 according to the present embodiment.

Figure 8:
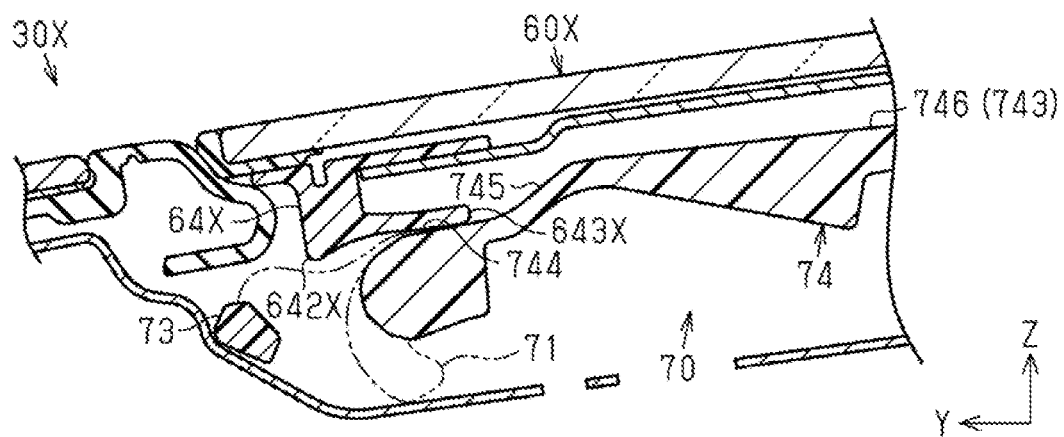
FIG. 8 is an end view orthogonal to a width direction of a sunroof unit according to a comparative example.

As illustrated in FIG. 8, in the sunroof unit 30X according to the comparative example, when the movable panel 60X performs the close operation to the full closed position, a folded screen 71 may be located between the sliding portion 64X of the movable panel 60X and an arm 74. In other words, the screen 71 may be sandwiched between the sliding portion 64X and the arm 74.

Figure 9:
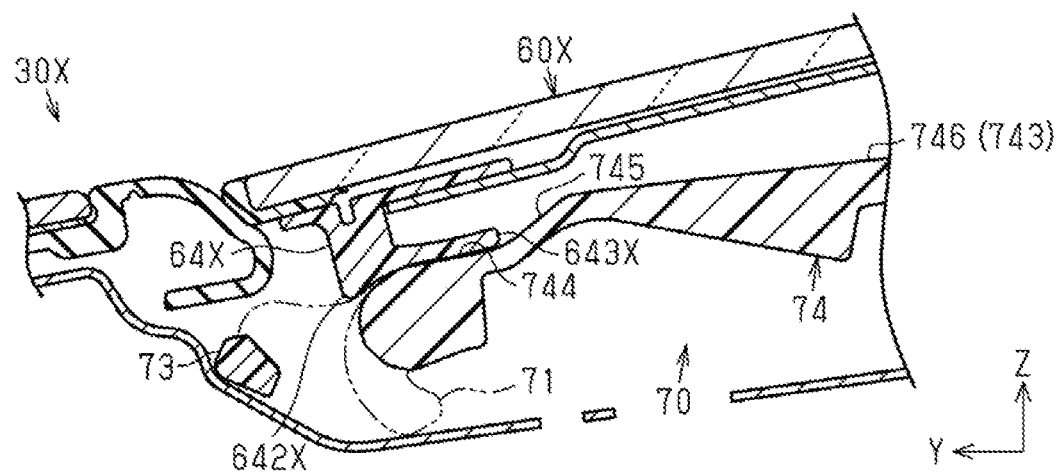
FIG. 9 is an end view orthogonal to the width direction of the sunroof unit according to the comparative example.

As illustrated in FIG. 9, when the movable panel 60X performs the open operation from the full closed position, a rear portion of the rear sliding portion 643X starts to slide with the arm 74. Further, the screen 71 is compressed between a front portion of the rear sliding portion 643X and the arm 74. On the other hand, a slight gap is generated between the front sliding portion 642X and the arm 74.

Figure 10:
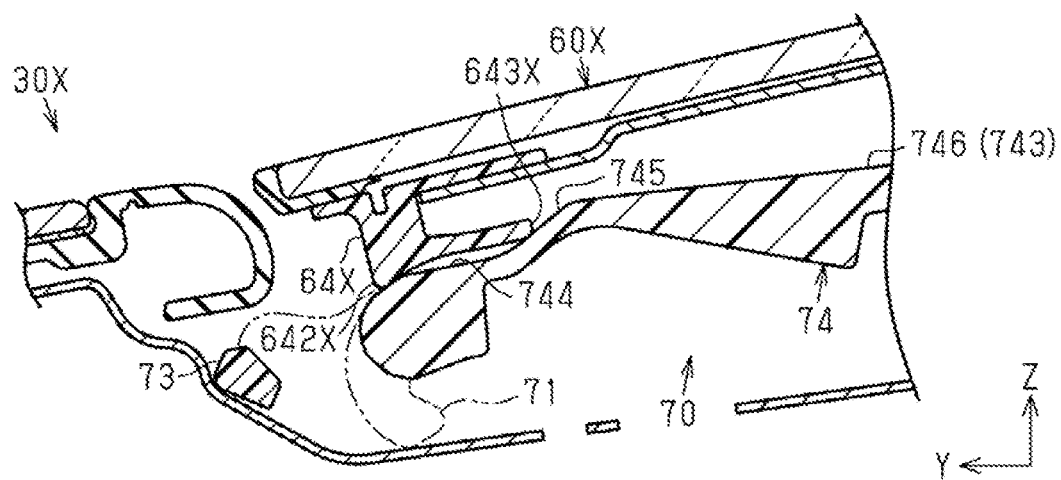
FIG. 10 is an end view orthogonal to the width direction of the sunroof unit according to the comparative example.

As illustrated in FIG. 10, when the movable panel 60X further performs the open operation, the rear portion of the rear sliding portion 643X continues to slide with the arm 74. On the other hand, there is no gap between the front sliding portion 642X and the arm 74, and the screen 71 is strongly compressed between the front sliding portion 642X and the arm 74. In other words, in the comparative example, in a case where the screen 71 is not present between the front sliding portion 642X and the arm 74, when the rear portion of the rear sliding portion 643X and the arm 74 slide, the front sliding portion 642X may be in contact with the arm 74. Specifically, when the rear sliding portion 643X slides with the second regulation surface 745 of the arm 74, the front sliding portion 642X may be in contact with the arm 74.

Subsequently, when the movable panel 60X further performs the open operation from the state illustrated in FIG. 10, the front sliding portion 642X moves rearward, and thus the screen 71 is not present between the front sliding portion 642X and the arm 74. At this time, the screen 71 compressed between the front sliding portion 642X and the arm 74 is relatively pulled from between the front sliding portion 642X and the arm 74, and thus a strange sound is generated. In this way, in the sunroof unit 30X according to the comparative example, a strange sound may be generated during the open operation of the movable panel 60X.

Figure 11:
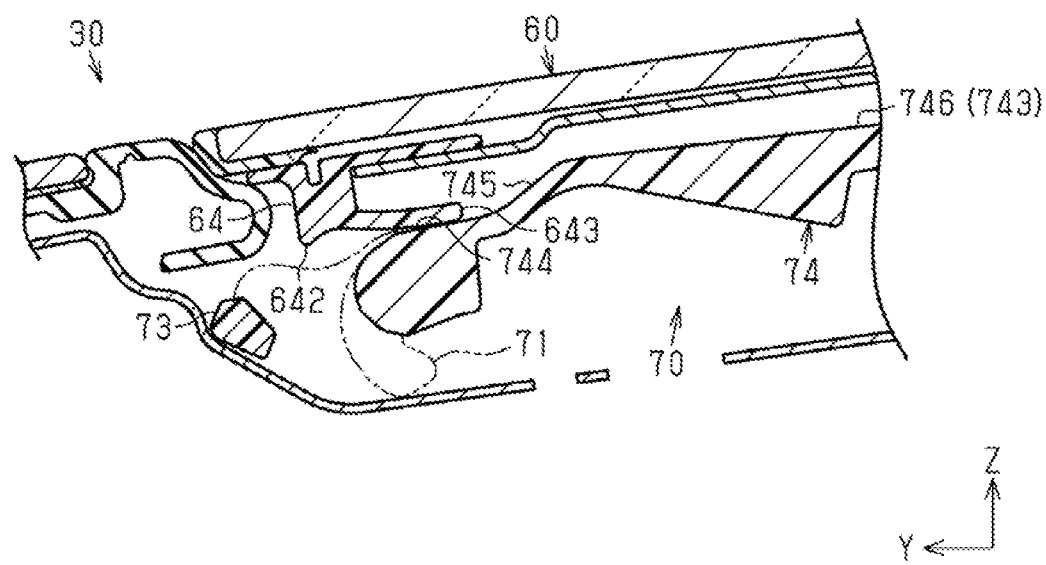
FIG. 11 is an end view orthogonal to the width direction of the sunroof unit according to the present embodiment.

Action of the sunroof unit 30 according to the present embodiment will be described with reference to FIGS. 11 to 14. As illustrated in FIG. 11, even in the sunroof unit 30 according to the present embodiment, when the movable panel 60X performs the close operation to the full closed position, the folded screen 71 may be sandwiched between the sliding portion 64 of the movable panel 60 and the arm 74.

Figure 12:
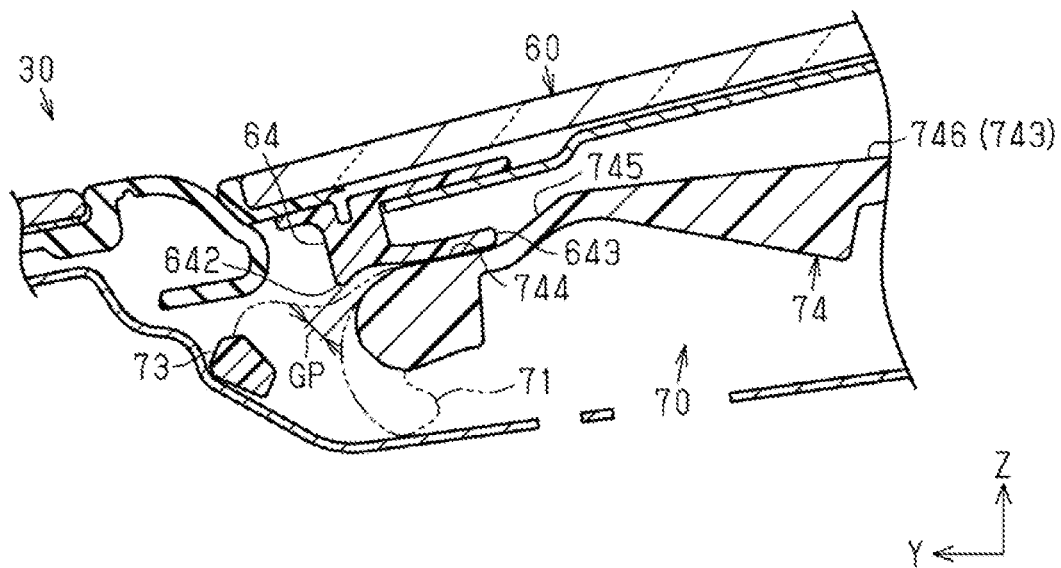
FIG. 12 is an end view orthogonal to the width direction of the sunroof unit according to the present embodiment.

As illustrated in FIG. 12, when the movable panel 60 performs the open operation from the full closed position, the screen 71 starts to be compressed between the sliding portion 64 and the arm 74. Further, in the state illustrated in FIG. 12, the rear sliding portion 643 slides with the first regulation surface 744 of the arm 74 while the front sliding portion 642 is separated from the arm 74. At this time, a gap GP greater than or equal to twice as thick as a thickness of the screen 71 is generated between the front sliding portion 642, specifically, the tip of the front sliding portion 642 and the arm 74.

Figure 13:
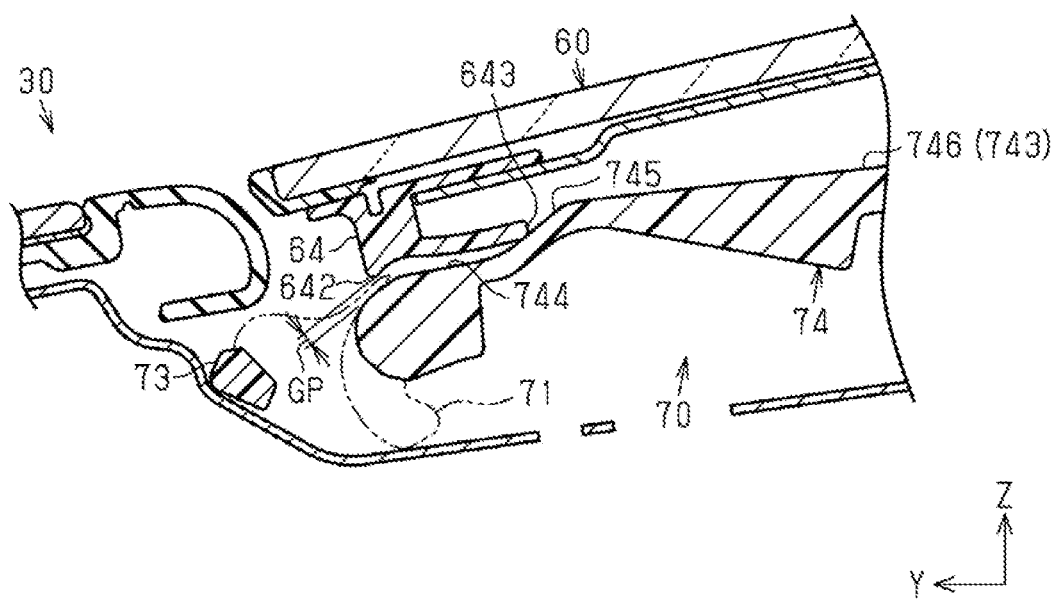
FIG. 13 is an end view orthogonal to the width direction of the sunroof unit according to the present embodiment.

As illustrated in FIG. 13, when the movable panel 60 further operates the open operation, the rear sliding portion 643 slides with the second regulation surface 745 of the arm 74 while the front sliding portion 642 is separated from the arm 74. At this time, the gap GP greater than or equal to twice as thick as a thickness of the screen 71 is also generated between the front sliding portion 642 and the arm 74.

Subsequently, when the movable panel 60 further performs the open operation from the state illustrated in FIG. 13, the screen 71 is not relatively present between the sliding portion 64 and the arm 74. At this time, the screen 71 is not compressed between the front sliding portion 642 and the arm 74, and thus a strange sound is not generated even when the screen 71 is relatively pulled from between the front sliding portion 642 and the arm 74. Therefore, in the sunroof unit 30 according to the present embodiment, regardless of a folded state of the screen 71 during the close operation of the movable panel 60, generation of a strange sound during the open operation of the movable panel 60 is suppressed.

Note that, when the rear sliding portion 643 slides with the second regulation surface 745 of the arm 74 even after the screen 71 is not present between the sliding portion 64 and the arm 74, the gap GP is still generated between the tip of the front sliding portion 642 and the arm 74.

Figure 14:
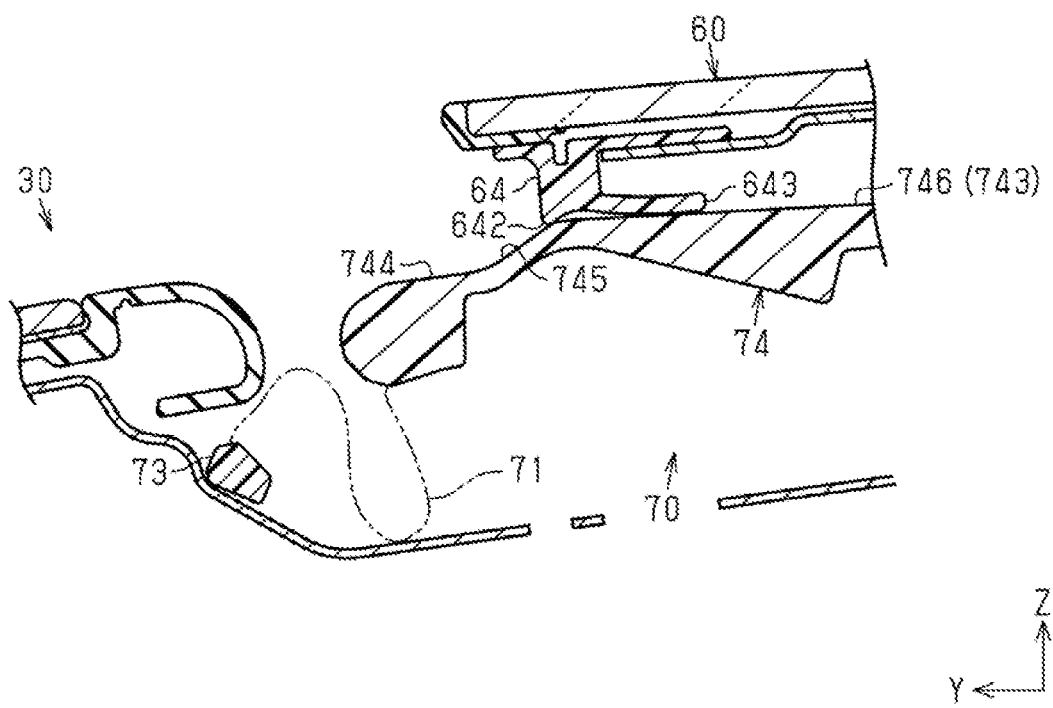
FIG. 14 is an end view orthogonal to the width direction of the sunroof unit according to the present embodiment.

Then, as illustrated in FIG. 14, when the rear sliding portion 643 slides with the third regulation surface 746 of the arm 74, the front sliding portion 642 is in contact with the second regulation surface 745 of the arm 74. Subsequently, when the front sliding portion 642 starts to slide with the second regulation surface 745 of the arm 74, the rear sliding portion 643 is not in contact with the arm 74.

In other words, in the present embodiment, in the movement range of the movable panel 60, a movement range between the position illustrated in FIG. 14 and the position illustrated in FIG. 6 is a "first sliding range" in which the front sliding portion 642 and the arm 74 slide, and a movement range between the full closed position illustrated in FIG. 8 and the position illustrated in FIG. 14 is a "second sliding range" in which the rear sliding portion 643 and the arm 74. The second sliding range is a movement range in front of the first sliding range in a point in which the rear sliding portion 643 slides with the arm 74 before the front sliding portion 642 during the open operation of the movable panel 60. Further, the first sliding range and the second sliding range are adjacent to each other in the front-rear direction.

The second sliding range includes the movement range of the movable panel 60 when the rear sliding portion 643 slides with the first regulation surface 744 and the second regulation surface 745. Thus, when the rear sliding portion 643 slides with the first regulation surface 744 and the second regulation surface 745, it can also be said that the gap GP is generated between the front sliding portion 642 and the arm 74. Furthermore, when the rear sliding portion 643 slides with the first regulation surface 744 and the second regulation surface 745, the gap GP generated between the front sliding portion 642 and the arm 74 may be greater than or equal to twice as thick as a thickness of the screen 71. In other words, even in a case where the movable panel 60 moves in the second sliding range, when the rear sliding portion 643 slides with the third regulation surface 746, the gap GP generated between the front sliding portion 642 and the arm 74 may be less than twice as thick as a thickness of the screen 71.

Further, in the present embodiment, in terms of the size of the screen 71, regardless of how the screen 71 is folded when the movable panel 60 is disposed in the full closed position, it is assumed that the folded screen 71 is not located between the movable panel 60 and the third regulation surface 746 of the arm 74.

Effects of the present embodiment will be described.

(1) In the sunroof unit 30, the rear sliding portion 643 among the front sliding portion 642 and the rear sliding portion 643 slides with the arm 74 in an initial stage in which the movable panel 60 starts to perform the open operation from the full closed position. In other words, in the initial stage in which the movable panel 60 starts to perform the open operation from the full closed position, the gap GP is generated between the front sliding portion 642 and the arm 74. Thus, under a circumstance where the screen 71 is located between the sliding portion 64 and the arm 74, when the movable panel 60 performs the open operation from the full closed position, the screen 71 is less likely to be sandwiched between the front sliding portion 642 and the arm 74. In other words, in the sunroof unit 30, a strange sound generated when the screen 71 compressed between the sliding portion 64 and the arm 74 is relatively pulled from between the sliding portion 64 and the arm 74 can be suppressed.

(2) When the rear sliding portion 643 slides with the arm 74, the gap GP greater than or equal to twice as thick as a thickness of the screen 71 is generated between the front sliding portion 642 and the arm 74. Therefore, in the sunroof unit 30, generation of a strange sound during the open operation of the movable panel 60 can be further suppressed.

(3) During the open operation of the movable panel 60, a state where the rear sliding portion 643 slides with the arm 74 shifts to a state where the front sliding portion 642 slides with the arm 74. Thus, when the sliding portion 64 slides with the third regulation surface 746 of the arm 74 during the open operation of the movable panel 60, timing at which the arm 74 reaches an uprising position is more likely to be delayed than that in the comparative example without including the front sliding portion 642. Thus, the arm 74 reaching the uprising position when the movable panel 60 is located in a rotation range of the movable frame 72 of the deflector device 70 is suppressed. In other words, in the sunroof unit 30, the arm 74 can be disposed in the uprising position after the movable panel 60 moves rearward to a certain extent.

The present embodiment can be performed by making a modification as follows. The present embodiment and the following modification example can be combined as long as they are not technically inconsistent.

The gap GP generated between the front sliding portion 642 and the arm 74 when the rear sliding portion 643 slides with the arm 74 may be less than twice as thick as a thickness of the screen 71. Even in this case, a strange sound generated when the screen 71 is relatively pulled from between the sliding portion 64 and the arm 74 is suppressed further than that when the gap GP is not generated.

A shape of the front sliding portion 642 and the rear sliding portion 643 may be appropriately changed. For example, the rear sliding portion 643 may protrude downward similarly to a shape of the front sliding portion 642.

In the arm 74, a shape such as a length and an inclination of the first regulation surface 744, the second regulation surface 745, and the third regulation surface 746 can be appropriately changed.

The base panel 40 may rotatably support the arm 74 of the deflector device 70 in front of the roof opening 41. In this case, the number of the arms 74 may be appropriately changed.

As in the embodiment described above, the sunroof device 50 may not be an outer slide sunroof device in which the movable panel 60 performs the open operation toward a space above the roof 21. Specifically, the sunroof device 50 may be an inner slide sunroof device in which the movable panel 60 performs the open operation toward a space between the roof 21 and a compartment.

A vehicular sunroof unit that solves the problem described above includes a movable panel that moves in a vehicle front-rear direction between a full closed position of closing a roof opening of a vehicle body and a full open position of opening the roof opening, a screen that is developed in a space of the roof opening toward a front of the vehicle when the movable panel moves from the full closed position to a rear of the vehicle, and is folded and stored when the movable panel moves from the full open position to the front of the vehicle, and an arm that rotates about a shaft line extending in a width direction of the vehicle between a developing position of developing the screen and a storing position of storing the screen while supporting the screen at a tip, and is biased toward the developing position. The movable panel includes a sliding portion that positions the arm by sliding with the arm. The sliding portion includes a front sliding portion, and a rear sliding portion located closer to the rear of the vehicle than the front sliding portion. A movement range of the movable panel includes a first sliding range in which the front sliding portion slides with the arm, and a second sliding range that is a movement range closer to the front of the vehicle than the first sliding range and in which the rear sliding portion slides with the arm. A gap is generated between the front sliding portion and the arm when the movable panel moves in the second sliding range.

In the sunroof unit having the configuration described above, when the movable panel moves from the full closed position to the rear of the vehicle, the movable panel moves in the first sliding range after moving in the second sliding range. Then, when the rear sliding portion slides with the arm by the movable panel moving in the second sliding range, the gap is generated between the front sliding portion and the arm. Thus, when the movable panel moves from the full closed position to the rear of the vehicle, the screen is less likely to be sandwiched between the front sliding portion and the arm. In other words, in the vehicular sunroof unit, a strange sound generated when the screen compressed between the sliding portion and the arm is relatively pulled from between the sliding portion and the arm can be suppressed.

In the vehicular sunroof unit described above, under a circumstance where the rear sliding portion slides with the arm, a gap generated between the front sliding portion and the arm may be a gap greater than or equal to twice as thick as a thickness of the screen.

The sunroof unit having the configuration described above is configured in such a way that, when the rear sliding portion slides with the arm, the gap greater than or equal to twice as thick as a thickness of the screen is generated between the front sliding portion and the arm. Thus, in the vehicular sunroof unit, generation of a strange sound during an open operation of the movable panel can be further suppressed.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A vehicular sunroof unit, comprising:
   a movable panel that moves in a vehicle front-rear direction between a full closed position of closing a roof opening of a vehicle body and a full open position of opening the roof opening;
   a screen that is developed in a space of the roof opening toward a front of the vehicle when the movable panel moves from the full closed position to a rear of the vehicle, and is folded and stored when the movable panel moves from the full open position to the front of the vehicle; and
   an arm that rotates about a shaft line extending in a width direction of the vehicle between a developing position of developing the screen and a storing position of storing the screen while supporting the screen at a tip, and is biased toward the developing position, wherein
   the movable panel includes a sliding portion that positions the arm by sliding with the arm,
   the sliding portion includes a front sliding portion, and a rear sliding portion located closer to the rear of the vehicle than the front sliding portion,
   a movement range of the movable panel includes a first sliding range in which the front sliding portion slides with the arm, and a second sliding range that is a movement range closer to the front of the vehicle than the first sliding range and in which the rear sliding portion slides with the arm, and
   a gap is generated between the front sliding portion and the arm when the movable panel moves in the second sliding range.

2. The vehicular sunroof unit according to claim 1, wherein,
   under a circumstance where the rear sliding portion slides with the arm, a gap generated between the front sliding portion and the arm is a gap greater than or equal to twice as thick as a thickness of the screen.

\* \* \* \* \*